(12) United States Patent
Tammaro (10) Patent No.: US 9,625,741 B1
(45) Date of Patent: *Apr. 18, 2017

(54) REMOVABLE CLIP-ON LENSES

(71) Applicant: Joseph Tammaro, Sarasota, FL (US)

(72) Inventor: Joseph Tammaro, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,465

(22) Filed: Apr. 19, 2016

Related U.S. Application Data (63) Continuation-in-part of application No. 14/500,713, filed on Sep. 29, 2014, now Pat. No. 9,389,437.

(51) Int. Cl.
   *G02C 7/08* (2006.01)
   *G02C 9/04* (2006.01)
   *G02C 7/10* (2006.01)
   *A45C 11/04* (2006.01)

(52) U.S. Cl.
   CPC ............... *G02C 9/04* (2013.01); *A45C 11/04* (2013.01); *G02C 7/10* (2013.01); *G02C 2200/08* (2013.01)

(58) Field of Classification Search
   CPC .. G02C 3/00; G02C 5/008; G02C 7/08; G02C 7/086; G02C 7/10; G02C 9/00; G02C 9/02; G02C 9/04; G02C 2200/16
   USPC .......................... 351/47, 48, 57, 58, 110, 140
   See application file for complete search history.

(56) References Cited

U.S. PATENT DOCUMENTS

| | | | |
|---|---|---|---|
| 1,280,515 A | 10/1918 | Mauhart, Jr. | |
| 1,348,712 A * | 8/1920 | Gitterman | G02C 7/16 2/13 |
| 1,610,043 A * | 12/1926 | Fillion | G02C 9/04 351/47 |
| 2,217,475 A | 9/1939 | Goehring, Sr. | |
| 3,890,037 A | 6/1975 | Zingarelli | |
| 4,729,650 A | 3/1988 | Jennings | |
| 5,017,001 A | 5/1991 | Kooketsu | |
| 5,617,153 A | 4/1997 | Allen et al. | |
| 5,694,192 A | 12/1997 | Lucki et al. | |
| 5,764,333 A | 6/1998 | Somsel | |
| 6,003,990 A | 12/1999 | Einhorn | |
| 6,113,233 A | 9/2000 | Miller | |
| 6,170,952 B1 | 1/2001 | La Haye et al. | |
| 6,331,057 B1 | 12/2001 | Strube | |
| 6,354,702 B2 | 3/2002 | Via' | |
| 6,655,799 B1 | 12/2003 | Chen | |
| 7,036,929 B1 | 5/2006 | Harvey | |

(Continued)

*Primary Examiner* — Huy K Mai
(74) *Attorney, Agent, or Firm* — Hanrahan Law Firm, P.A.; Benjamin M. Hanrahan (57) ABSTRACT

A clip-on lens assembly for removable disposition and/or mounting to existing eyeglasses is presented. The clip-on lens assembly include at least one clip-on lens selectively positionable in a removably coupled relation to a pair of eyeglasses, and disposed in an at least partially overlying relation to the eyeglass lens. The clip-on lens includes at least two mounting clips disposed at an upper portion thereof, the mounting clips being structured to removably engage or contact the eyeglasses. Particularly, the mounting clips of certain embodiments include a base fixedly secured to the clip-on lens, and a flexible mounting portion extending outwardly therefrom. The flexible mounting portion may be flexed or moved outwardly to expose or enlarge an opening through which a portion of the eyeglasses are positioned. The flexible mounting portion will then engage or contact the eyeglasses for mounting the clip-on lenses thereto.

16 Claims, 8 Drawing Sheets

(56) References Cited

U.S. PATENT DOCUMENTS

| | | | |
|---|---|---|---|
| 7,445,331 B2 | 11/2008 | McDermott | |
| 7,883,205 B2 | 2/2011 | Begg | |
| 9,389,437 B1 * | 7/2016 | Tammaro | G02C 9/04 |
| 2004/0040869 A1 | 3/2004 | Menceles | |
| 2010/0073625 A1 * | 3/2010 | Engstrom | A45C 11/04 |
| | | | 351/63 |
| 2011/0181828 A1 | 7/2011 | Yi et al. | |

* cited by examiner

REMOVABLE CLIP-ON LENSES

CROSS REFERENCE TO RELATED APPLICATIONS/CLAIM OF PRIORITY

The present application is a Continuation-In-Part Patent Application of previously-filed, currently-pending U.S. patent application Ser. No. 14/500,713, filed on Sep. 29, 2014, the contents of which are incorporated herein its entirety.

FIELD OF THE INVENTION

The present invention is generally directed to a pair of removable clip-on lenses which can be selectively and individually attached to a pair of eyeglasses.

BACKGROUND OF THE INVENTION

Individuals who wear prescription eyeglasses or corrective eyeglasses often carry an additional pair of glasses for sun protection. The second pair of eyeglasses is often bulky, particularly if carried within a case, and are subject to damage if not carried or stored in a case. Furthermore, at least one of two pairs of glasses (e.g., corrective/prescription eyeglasses or sunglasses) are often lost, damaged or stolen, particularly, when the user takes one pair off and puts the other pair on.

Some prescription glasses are specifically structured to automatically change or implement tinting when exposed to different levels of sun or shade. Particularly, the lenses may be configured to automatically tint when exposed to the sun and automatically revert back to being transparent when not exposed to the sun. These types of lenses are often extremely expensive and can, in many cases, malfunction or otherwise not operate in the intended manner or desired manner. For example, some individuals may not want the lenses to tint at certain times, however, there is no control over when the lenses tint.

There is thus a need in the art for a solution to easily carry sun protection and be able to selectively position the sun protection over the user's glasses when needed or desired. The proposed sun protection may include separate and individual clip-on lenses that can be stored individually within a small bag or pouch that can be easily carried in an unobtrusive manner. The small pouch may be attached to a key chain or easily fit within a pocket, purse or bag for use whenever needed or desired.

Further, the clip-on lenses may be manufactured from materials that are exceptionally durable but are not bulky and do not scratch or damage the user's existing eyeglasses. The clip-on lenses may include one or more rubber or flexible mounting clips that can be easily attached to the user's eyeglasses. When no longer need, the user can easily detach the clip-on lenses from the eyeglasses and return them to the bag or pouch for easy portability and accessibility. A cleaning cloth may be included within the pouch in order to maintain the cleanliness of the lenses and keep them free from dirt and smudges.

SUMMARY OF THE INVENTION

The present invention is directed to a clip-on lens assembly comprising at least one, but more practically, a plurality of two clip-on lenses structured for removable disposition or mounting onto a pair of eyeglasses. In certain embodiments, the clip-on lenses are tinted (e.g., polarized or unpolarized) and can be added or mounted to corrective eyeglasses, such as spectacles or prescription eyewear. In other embodiments, however, the clip-on lenses may comprise corrective lenses or prescription lenses which can be selectively added or mounted to any eyewear, including but not limited to sunglasses or other tinted eyewear.

In any event, the clip-on lenses of the various embodiments include one or more mounting clips disposed thereon for selective disposition of the clip-on lenses in a removable mounting relation with the eyeglasses. Each of the lenses may be separate from one another, or otherwise not connected to one another, allowing for selective and independent mounting thereof. This also allows the clip-on lenses to be stored in a small pouch and easily carried by the user, e.g., in a pocket, on a key chain, etc., for easy transition and mounting at virtually any time or location.

Furthermore, the mounting clips may include a flexible mounting portion which can at least partially bend outward exposing an opening or receiving portion. The clip-on lenses may be positioned over the lenses of the eyeglasses wherein the opening or receiving portion of the flexible mounting portion may be disposed over a top portion of the eyeglasses (e.g. over the top frame, if present and/or lens). In this manner, the mounting clips of certain embodiments may include a general "C" shaped configuration structured to at least partially engage or contact an inner surface of the eyeglasses. The mounting clip and/or engaging end portion thereof may be constructed of rubber or other material that will not scratch or damage the eyeglasses or the lenses thereof.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

As shown in the accompanying drawings, and with particular reference to FIG. 1 through 5, the present invention is directed to a clip-on lens assembly, generally referenced as 10. Specifically, the clip-on lens assembly 10 of the various embodiments includes at least one, but preferably two separate and independent clip-on lenses 20, 30 disposable in a removably attached manner to a pair of glasses or spectacles 2. Each of the clip-on lenses 20, 30 may be tinted, such as in the form of sunglass lenses, whether polarized or unpolarized, and which can be selectively attached or mounted to conventional corrective eyeglasses 2, such as spectacles, prescription eyewear, etc. in order to add tinting to the eyeglasses 2 when needed or desired.

Particularly, the clip-on lenses 20, 30 may be disposed in an at least partially overlying relation to the lenses 4, 6 of the eyeglasses 2, such that a user wearing the eyeglasses 2 with the attached or mounted clip-on lenses 20, 30 will be able to simultaneously see through the generally clear lenses 4, 6 of the eyeglasses 2 and the tinted clip-on lens(es) 20, 30 of the clip-on lens assembly 10 mounted thereon. It should also be noted that the clip-on lenses 20, 30 of certain embodiments of the present invention may be in the form of corrective lenses, prescription lenses, reading lenses etc., and may thus include a substantially clear or transparent configuration, while the eyeglasses 2 may be sunglasses or tinted eyewear. In this regard, while the clip-on lens assembly 10 of at least one embodiment may add tinted lenses to traditional corrective eyewear, other embodiments may add corrective lenses to sunglasses, tinted eyewear and/or reading power lenses to distance power correcting spectacle eyewear.

In any event, the clip-on lens assembly 10 of at least one embodiment includes two separate and unattached clip-on lenses 20, 30 that can be individually attached to the left and right lenses 4, 6 of the eyeglasses 2. Certain embodiments of the clip on-lenses 20, 30 include a substantially similar shape or configuration as the eyeglasses 2, although other shapes and sizes whether similar or different than the eyeglasses is contemplated. With the individual clip-on lenses 20, 30 being separate, independent or otherwise unattached to one another, each can be selectively and individually attached or mounted to the eyeglasses 2, and each can be individually stored in a small pouch or other location when not in use, as will be described in more detail herein.

Figure 1:
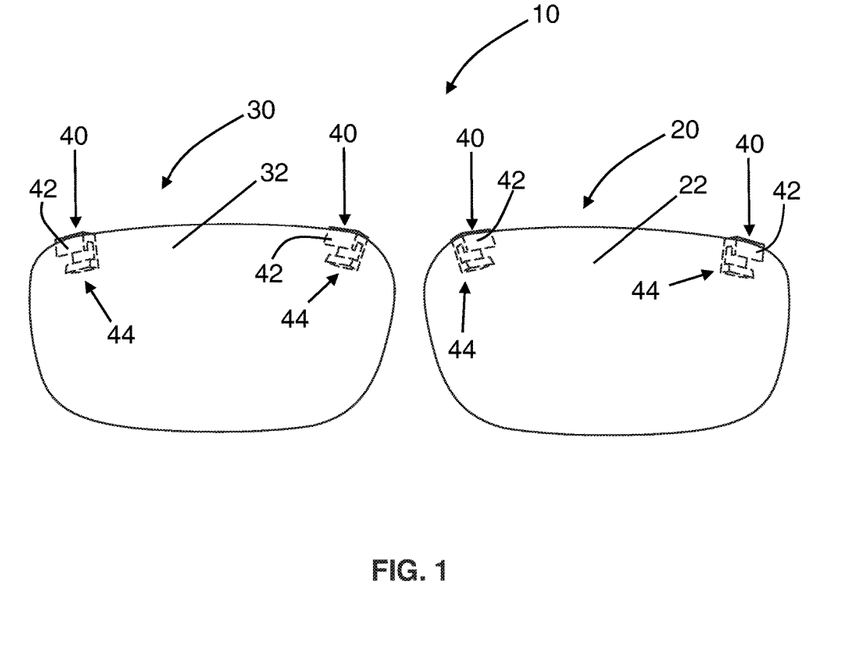
FIG. 1 is a front view of the clip-on lens assembly as disclosed in accordance with at least one embodiment of the present invention.
Figure 2:
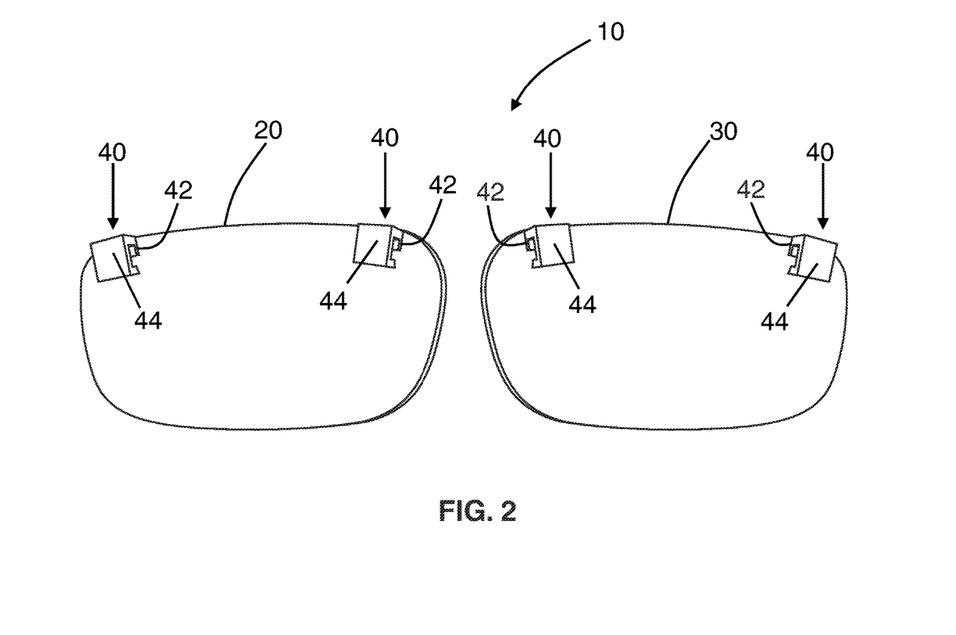
FIG. 2 is a rear view of the clip-on lens assembly illustrated in the exemplary embodiment of FIG. 1.
Figure 3:
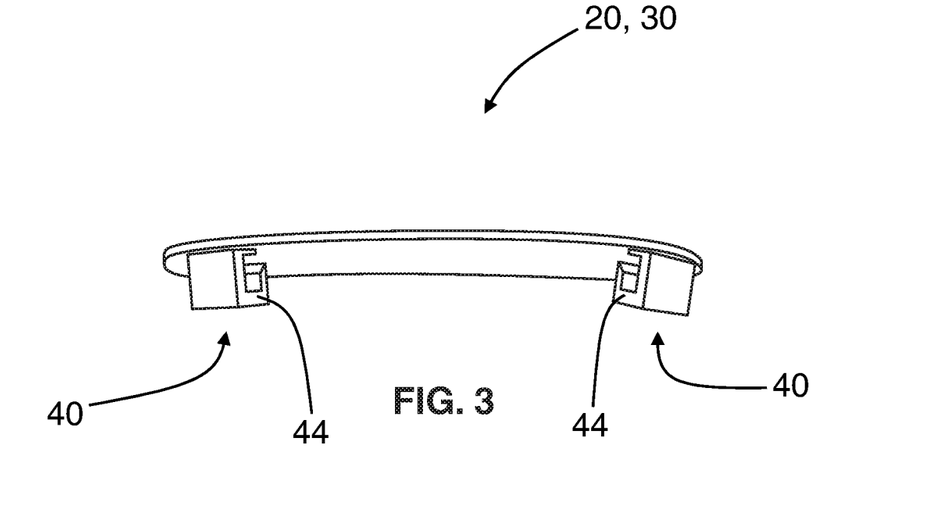
FIG. 3 top view of a clip-on lens illustrated in accordance with at least one embodiment of the clip-on lens assembly disclosed herein.
Figure 4:
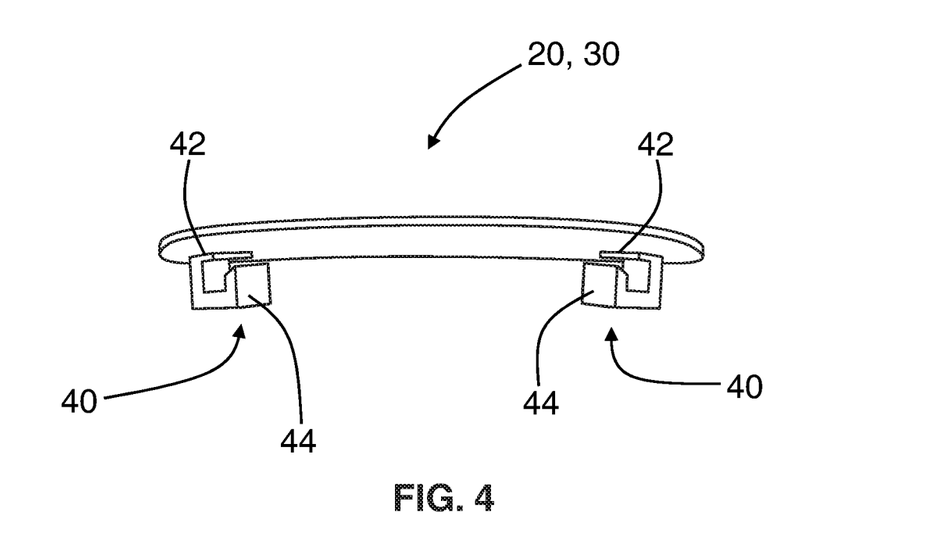
FIG. 4 is a bottom view of the clip-on lens illustrated in the exemplary embodiment of FIG. 3.
Figure 7:
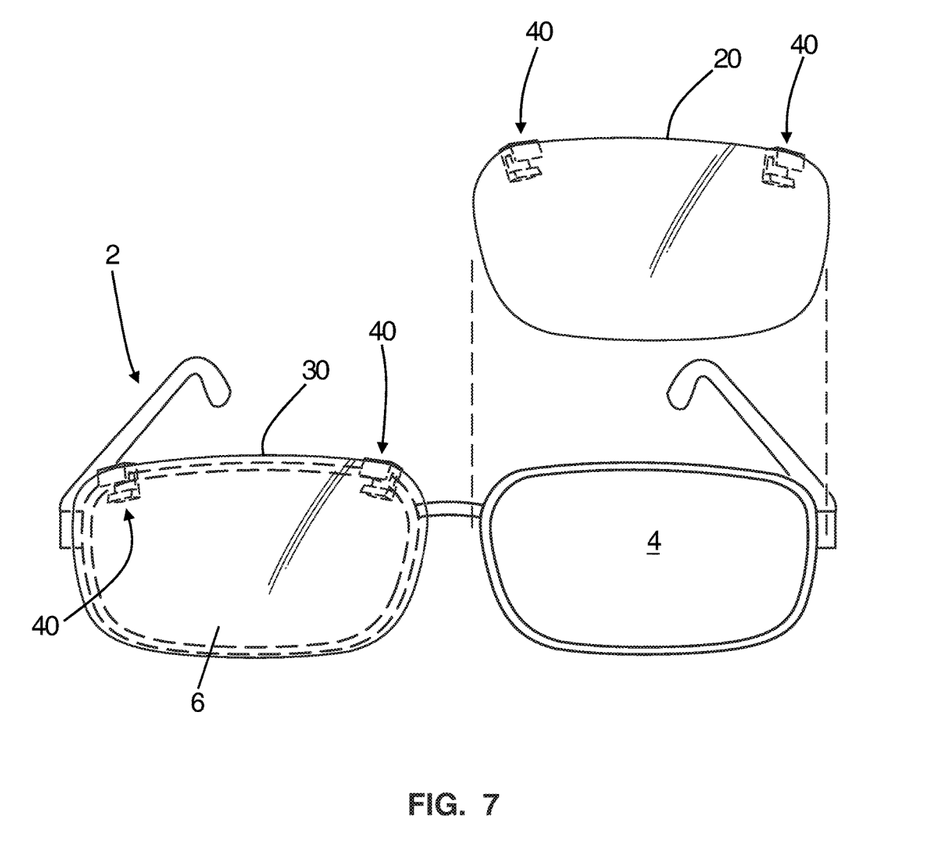
FIG. 7 is a partially exploded front view of the clip-on lens assembly as disclosed in accordance with at least one embodiment of the present invention.

Furthermore, the various embodiments of the present invention also include at least one mounting clip 40 attached or secured to the clip-on lenses 20, 30 for removable disposition or mounting of the lens assembly to the eyeglasses 2. For instance, the mounting clip(s) 40 of at least one embodiment of the present invention may be secured to or proximate an upper portion 22, 32 of the corresponding clip-on lens 20, 30, as illustrated in FIG. 1. Furthermore, certain embodiments may include a plurality of at least two mounting clips 40 disposed in a spaced relation from one another along or proximate the top or upper portion 22, 32 of the corresponding lens 20, 30. For instance, the mounting clips 40 may be attached or secured to the clip-on lens 20, 30 proximate the upper corners or upper ends of the clip-on lens 20, 30, as shown in the figures. Accordingly, the mounting clips 40 are structured and disposed to attach or mount to a corresponding upper portion of the eyeglasses 2, for example, by lowering the clip-on lens 20, 30 thereupon, as generally shown in FIG. 7. It should be noted, however, that other positions or locations of the mounting clip(s) 40 structured to facilitate practice of the present invention in the intended manner are contemplated herein.

Moreover, the mounting clip(s) 40 of at least one embodiment comprises a base 42 and a mounting portion 44. The base 42 is fixedly secured to the clip-on lens 20, 30 and the mounting portion 44 extends outwardly therefrom and is structured to facilitate mounting of the clip-on lens 20, 30 to the eyeglasses 2. As shown in FIGS. 1 through 6, the base 42 of at least one embodiment include a generally flat section secured to an upper portion of the inner surface 24, 34 of the corresponding clip-on lens 20, 30. Particularly, the base 42 may be fixedly attached to the clip-on lens 20, 30 via adhesion, although other forms of attachment are contemplated within the full spirit and scope of the present invention. Additionally, the mounting clip 40 and/or the base 42 thereof may be secured or attached to the clip-on lens 20, 30 at a location or locations other than that shown in the figures. For example, the mounting clip(s) 40 may be secured or attached to the uppermost edge rather than an inner surface 24, 34 of the clip-on lens 20, 30.

Figure 5:
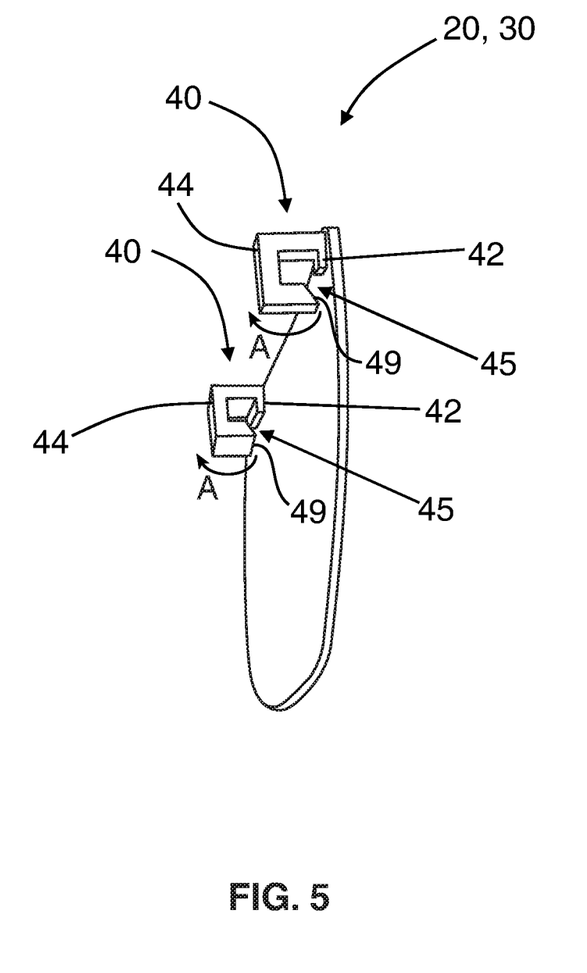
FIG. 5 is a side perspective view of the clip-on lens illustrated in the exemplary embodiment of FIG. 4.
Figure 6:
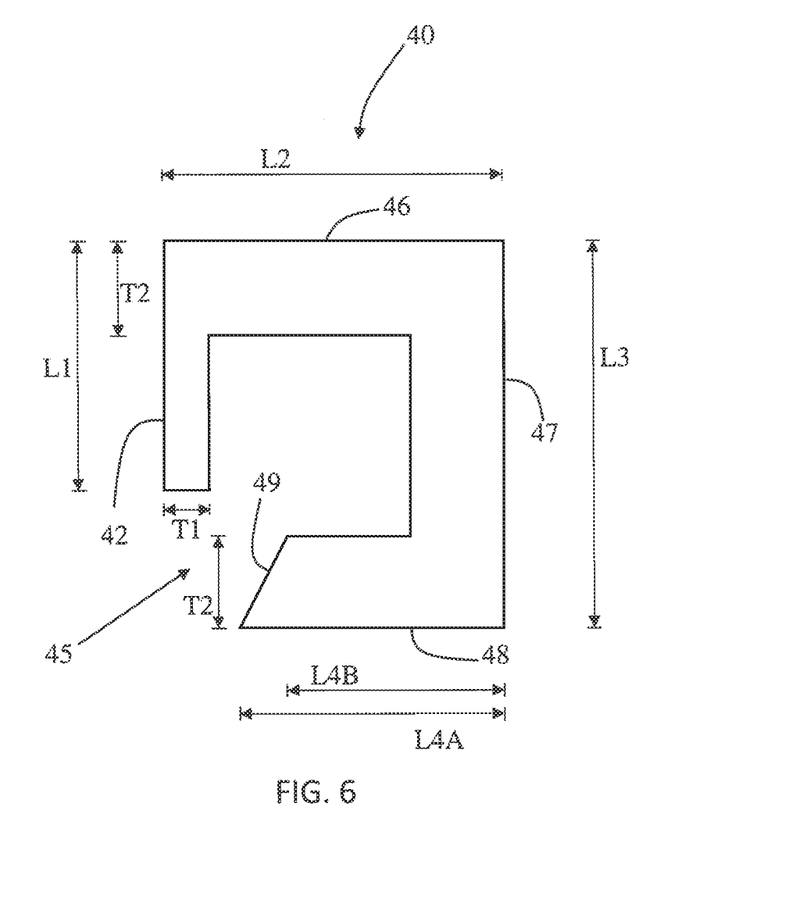
FIG. 6 is a side view of the mounting clip as disclosed in accordance with at least one embodiment of the present invention.

Further, the mounting portion 44 of at least one embodiment comprises a partially open looped configuration or "C" shaped configuration defining an opening or inner portion 45. The "C" shaped configuration may be defined by three portions 46, 47, 48 as illustrated in FIGS. 5 and 6, for example. It should be noted that while portions 46, 47, 48 are illustrated to form an angled configuration there between, the mounting portion 44 of the mounting clip 40 may be rounded, or include additional sections or portions than those illustrated.

In addition, the mounting portion 44 of at least one embodiment comprises a substantially flexible construction allowing the mounting portion 44 to be movably disposed or positioned relative to the base 42 and/or the lens 20, 30. For example, the mounting clip 40 and/or the mounting portion 44 thereof may be formed of a flexible rubber or gasket-like material, although other substantially flexible materials may be contemplated within the full spirit and scope of the present invention.

In particular, referring to FIG. 5, the mounting portion 44 of the mounting clip 40 may be selectively moved or flexed at least partially upward and/or in the direction generally indicated by arrows A. Movement of the mounting portion 44 in direction A moves end 49 at least partially away from the lens 20, 30 and at least partially expands or exposes the opening or inner portion 45 between the mounting portion 44 and the clip-on lens 20, 30. Movement or flexing of the mounting portion 44 may be accomplished with a user's finger (not shown) or by engaging the mounting portion 44 with an upper portion of the eyeglasses 2. In this manner, the flexible mounting portion 44 of the mounting clip 40 may be movably positioned over a top or upper portion of the eyeglasses for selective disposition of the clip-on lens 20, 30 in a removably coupled relation with the eyeglasses 2.

For example, a user may pull outward and/or upward (in direction A) on the mounting portion 44 in order to expose or expand opening 45 and lower the mounting portion 44 onto the eyeglasses 2 to mount the clip-on lens assembly 10 to the eyeglasses 2. As another example, rather than manually pulling on, flexing or movably disposing the mounting portion 44, the user may lower the mounting portion 44 onto the upper portion of the eyeglasses 2 positioning the eyeglasses 2 within the opening 45. The flexibility of the mounting portion 44 will movably dispose the mounting portion 44 relative to the eyeglasses and expand the opening 45 as the user pushes or disposes the clip-on lens 20, 30 onto the eyeglasses 2.

Figure 8:
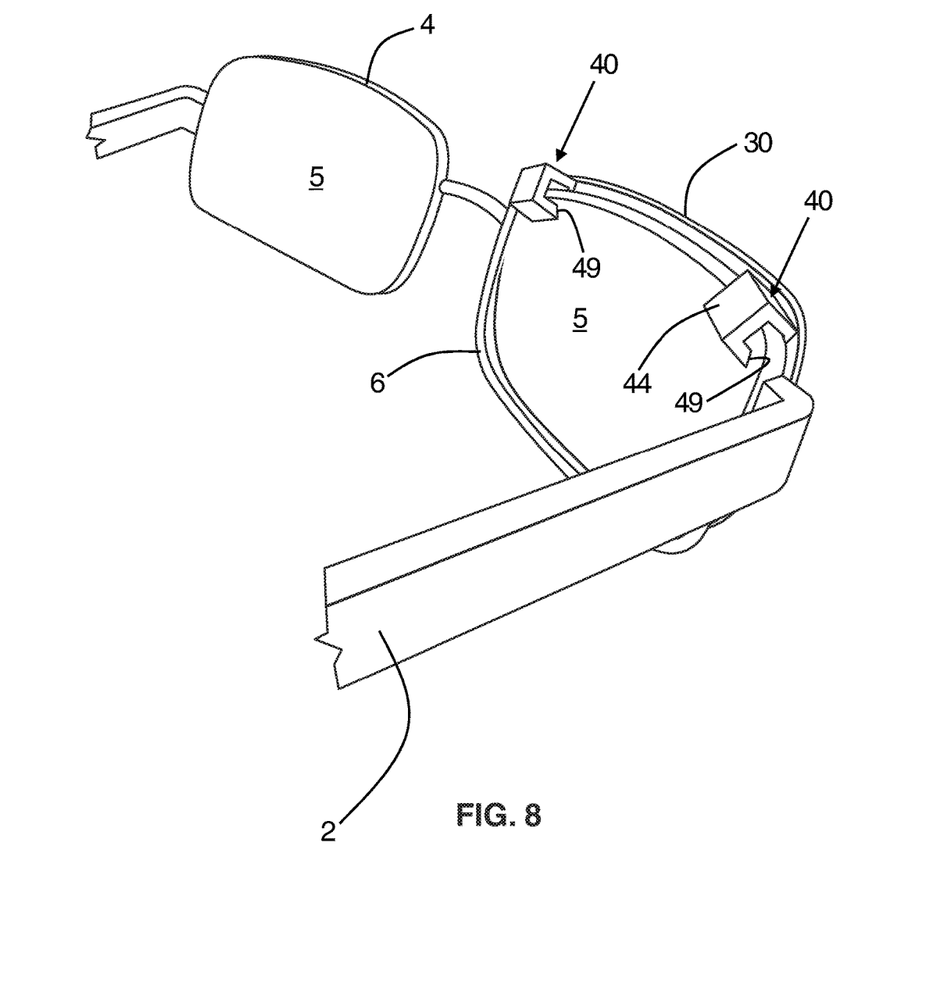
FIG. 8 is a rear perspective view of a clip-on lens mounted to eyeglasses as disclosed in accordance with at least one embodiment herein.

Referring now to FIG. 8, when the clip-on lens 30 is disposed in the removably coupled relation to the eyeglasses 2, the mounting portion 44 of the mounting clip 40 is structured to at least partially engage or contact an inner surface of the eyeglasses 2. For example, end 49 of the mounting portion 44 may engage or contact an inner surface 5 of the lens 6 and/or frame of the eyeglasses 2. This positions the clip-on lens 30 in an at least partially overlying relation to the lens 6 of the eyeglasses 2 and allows the user to easily and selectively mount or remove the clip-on lens 30 as desired.

Furthermore, as illustrated in FIGS. 5, 6, 7 and 8, for example, the end portion 49 of the mounting portion 44 may include an at least partially angled configuration. The angled configuration may be inwardly disposed or angled inwardly toward opening 45, as illustrated. In this manner, while the flexible mounting portion 44 is flexed at least partially open or outward (e.g., in direction A, FIG. 5) and while attached or mounted to the eyeglasses (FIG. 8), the at least partially angled end portion 49 may be disposed in a substantially flush or supportive relation with the inner surface 5 of the lens 6 or eyeglasses 2. For instance, when the mounting portion 44 is attached or mounted to the eyeglasses 2, the mounting portion 44 may be at least partially flexed or outwardly disposed, thereby positioning the angled end portion 49 in an at least partially flush or flat engaging relation with the inner surface 5 of the lens 6 or eyeglasses 2.

Referring to the exemplary embodiment of the mounting clip 40 of at least one embodiment, exemplary (non-limiting) dimensions and configurations are provided. For example, length L1 of base 42 may be in the range of approximately 0.16 inches, length L2 of first portion 46 may be in the range of approximately 0.22 inches, length L3 of second portion 47 may be in the range of approximately 0.25 inches, outer length L4A of third portion 48 may be in the range of approximately 0.17 inches, and inner length L4B of third portion 48 may be in the range of 0.14 inches. In this regard, inwardly directed acute angle B may be in the range of approximately 60-65 degrees. Further, thickness Ti of the base 42 may be in the range of approximately 0.03 inches and thickness of the mounting portions 44 may be in the range of approximately 0.06 inches. It should be apparent, however, that these dimensions (e.g., lengths, thicknesses and degrees) should in no way be deemed limiting and are presented herein as merely exemplary in accordance with at least one illustrative embodiment of the present invention. Other dimensions are thus contemplated within the full spirit and scope of the present invention.

Figure 9:
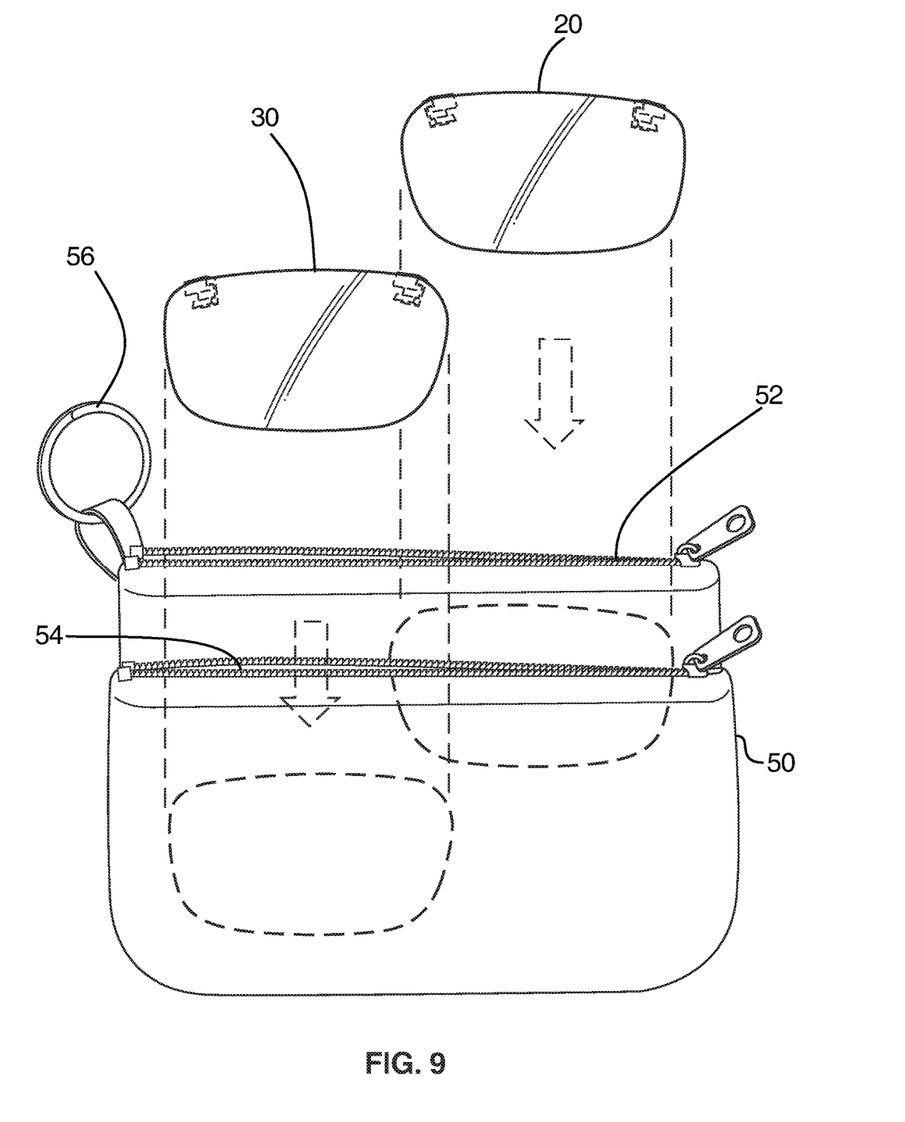
FIG. 9 is an exploded view of the clip-on lens assembly disposable within a storage pouch as disclosed in accordance with at least one embodiment herein.

Additional features of certain embodiments of the present invention include a storage pouch 50 for storing the clip-on lens assembly 10 when not in use, or otherwise when the clip-on lens assembly 10 is not mounted to eyeglasses. For instance, due to the separate, independent and unattached nature of the two clip-on lenses 20, 30, the clip-on lenses 20, 30 are able to be stored in a small pouch 50, for example, within one or more pockets 52, 54 thereof. In particular, the clip-on lenses 20, 30 may be stored in the same or different pockets 52, 54 of a single pouch 50. The pouch 50 may also include a key ring or key chain attachment device 56 for securing the pouch 50 to a key ring. In this manner, the user may be able to tote the clip-on lens assembly 10 within the small pouch 50 and attached to the user's key chain. The separate and independent clip-on lenses 20, 30 may thus be easily and readily available for use and ready to be easily clipped on or mounted to the user's eyeglasses, as disclosed herein.

This written description provides an illustrative explanation and/or account of the present invention. It may be possible to deliver equivalent benefits and insights using variations of the specific embodiments without departing from the inventive concept. This description and these drawings, therefore, are to be regarded as illustrative and not restrictive.

Now that the invention has been described,

What is claimed is:

1. A clip-on lens assembly, comprising:
   two separate and unattached clip-on lenses disposable in a removably coupled relation to a pair of eyeglasses, wherein each of said two separate and unattached clip-on lenses are removably disposable in an at least partially overlying relation to a lens of the eyeglasses, and
   at least one mounting clip fixedly attached to each of said two separate and unattached clip-on lenses,
   said mounting clips each comprising a base fixedly attached to an inner surface of a corresponding one of said clip-on lenses, and a flexible mounting portion extending from said base, wherein at least a portion of said base of each of said mounting clips is disposed between said corresponding one of said clip-on lenses and the lens of the eyeglasses.

2. The clip-on lens assembly as recited in claim 1 wherein said base of each of said mounting clips is at least partially disposed between an inner surface of said corresponding one of said clip-on lenses and an outer surface of the lens of the eyeglasses.

3. The clip-on lens assembly as recited in claim 2 wherein a portion of the eyeglasses at least partially contact said base when said clip-on lens is disposed in said removably coupled relation to the eyeglasses.

4. The clip-on lens assembly as recited in claim 3 wherein said flexible mounting portion of each of said mounting clips is structured to at least partially engage an inner surface of the lens of the eyeglasses for disposition of said clip-on lens in said removably coupled relation to the eyeglasses.

5. The clip-on lens assembly as recited in claim 4 wherein said base and said flexible mounting portion are entirely disposed on an inner side of said corresponding one of said clip-on lenses.

6. The clip-on lens assembly as recited in claim 5 wherein said flexible mounting portion of each of said mounting clips comprises an inwardly angled end portion.

7. The clip-on lens assembly as recited in claim 6 wherein said inwardly angled end portion is disposed in a substantially engaged relation with the inner surface of the lens of the eyeglasses for disposition of said clip-on lens in said removably coupled relation to the eyeglasses.

8. The clip-on lens assembly as recited in claim 7 wherein each of said two separate and unattached clip-on lenses comprises at least two mounting clips disposed proximate an upper portion of said clip-on lens.

9. The clip-on lens assembly as recited in claim 8 further comprising a storage pouch for disposition of said two separate and unattached clip-on lenses, said storage pouch comprising two separate compartments wherein each of said clip-on lenses are disposable in a different one of said two separate compartments.

10. A clip-on lens assembly, comprising:
    at least one clip-on lens selectively positionable in a removably coupled relation to a pair of eyeglasses, said clip-on lens being disposable in an at least partially overlying relation to a lens of the eyeglasses,
    at least two mounting clips disposed proximate an upper portion of said clip-on lens, said mounting clips being structured to removably engage the eyeglasses for disposing said clip-on lens in said removably coupled relation to the eyeglasses, said mounting clips comprising a base and a flexible mounting portion, said base being fixedly attached to an inner surface of said clip-on lens and said flexible mounting portion extending from said base, and said base comprising an exposed surface disposable between said inner surface of said clip-on lens and an outer surface of the eyeglasses.

11. The clip-on lens assembly as recited in claim 10 wherein a portion of the eyeglasses contact said exposed surface of said base when said clip-on lens is disposed in said removably coupled relation to the eyeglasses.

12. The clip-on lens assembly as recited in claim 11 wherein said flexible mounting portion is movably positioned over a top portion of the eyeglasses for selective disposition of said clip-on lens in said removably coupled relation to the eyeglasses.

13. The clip-on lens assembly as recited in claim 12 wherein said flexible mounting portion comprises an end portion disposed in a substantially engaged relation with an inner surface of the lens of the eyeglasses for disposition of said clip-on lens in said removably coupled relation to the eyeglasses.

14. The clip-on lens assembly as recited in claim 13 wherein said end portion comprises an inwardly angled configuration.

15. A clip-on lens, comprising:

at least one clip-on lens selectively positionable in a removably coupled relation to a pair of eyeglasses, at least one mounting clip at least substantially disposed on an inner side of said clip-on lens, said mounting clip being structured to removably engage said eyeglasses for disposing said clip-on lens in said removably coupled relation to said pair of eyeglasses, and said mounting clip comprising a base and a flexible mounting portion, said base being fixedly attached to an inner surface of said clip-on lens and said flexible mounting portion extending outwardly from said base, wherein said base comprises an exposed surface disposable between said inner surface of said clip-on lens and an outer surface of the eyeglasses such that a portion of the eyeglasses contact said exposed surface of said base when said clip-on lens is disposed in said removably coupled relation to said eyeglasses.

16. The clip-on lens as recited in claim 15 wherein said at least one mounting clip is entirely disposed on said inner side of said clip-on lens.

\* \* \* \* \*